United States Patent
Amon et al.

(10) Patent No.: US 9,258,561 B2
(45) Date of Patent: Feb. 9, 2016

(54) METHOD FOR CODING A SEQUENCE OF DIGITAL IMAGES

(75) Inventors: Peter Amon, Munich (DE); Andreas Hutter, Munich (DE); André Kaup, Effeltrich (DE); Andreas Weinlich, Windsbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 70 days.

(21) Appl. No.: 14/235,234

(22) PCT Filed: Jul. 11, 2012

(86) PCT No.: PCT/EP2012/063548
§ 371 (c)(1),
(2), (4) Date: May 27, 2014

(87) PCT Pub. No.: WO2013/013977
PCT Pub. Date: Jan. 31, 2013

(65) Prior Publication Data
US 2014/0286589 A1 Sep. 25, 2014

(30) Foreign Application Priority Data

Jul. 25, 2011 (EP) ................................. 11175227
Jan. 31, 2012 (EP) ................................. 12153221

(51) Int. Cl.
*G06K 9/36* (2006.01)
*G06K 9/46* (2006.01)
(Continued)

(52) U.S. Cl.
CPC ....... *H04N 19/00684* (2013.01); *H04N 19/182* (2014.11); *H04N 19/51* (2014.11);
(Continued)

(58) Field of Classification Search
None
See application file for complete search history.

(56) References Cited

U.S. PATENT DOCUMENTS 8,559,763 B2 * 10/2013 Chen ............................ 382/300
2006/0209959 A1 9/2006 Sun

FOREIGN PATENT DOCUMENTS

EP 11175227.5 7/2011
EP 12153221.2 1/2012
(Continued)

OTHER PUBLICATIONS

Andreas Weinlich et al., "Sparse representation of dense motion vector fields for lossless compression of dynamic medical CT data," to be submitted to 2011 18th IEEE International Conference on Image Processing (ICIP 2011), Brussels, Sep. 2011, 5 pages.
(Continued)

*Primary Examiner* — Bhavesh Mehta
*Assistant Examiner* — Feng Niu
(74) *Attorney, Agent, or Firm* — Staas & Halsey LLP (57) ABSTRACT

A method codes a sequence of digital images, each image having the same image format and including a number of pixels with assigned pixel values. Motion parameters between first and second images are determined, where based on said motion parameters a motion compensation is performed for coding the sequence of images, where said motion parameters are included in the coded sequence of images. The motion parameters between a first image and a second image include a scalar field having scalar values for a plurality of image positions in the image format. The scalar field is determined such that gradient vectors derived from the scalar field correspond to motion vectors for the motion compensation.

20 Claims, 4 Drawing Sheets

(51) Int. Cl.
| | |
|---|---|
| H04N 19/51 | (2014.01) |
| H04N 19/513 | (2014.01) |
| H04N 19/63 | (2014.01) |
| H04N 19/61 | (2014.01) |
| H04N 19/182 | (2014.01) |
| H04N 19/53 | (2014.01) |
| H04N 19/537 | (2014.01) |
| H04N 19/517 | (2014.01) |
| H04N 19/577 | (2014.01) |
| H04N 19/615 | (2014.01) |
| H04N 19/13 | (2014.01) |

(52) U.S. Cl.
CPC .......... *H04N 19/513* (2014.11); *H04N 19/517* (2014.11); *H04N 19/53* (2014.11); *H04N 19/537* (2014.11); *H04N 19/577* (2014.11); *H04N 19/61* (2014.11); *H04N 19/615* (2014.11); *H04N 19/63* (2014.11); *H04N 19/13* (2014.11)

(56) References Cited

FOREIGN PATENT DOCUMENTS

| | | |
|---|---|---|
| WO | 2008/024352 | 2/2008 |
| WO | PCT/EP2012/063548 | 7/2012 |

OTHER PUBLICATIONS

Andreas Weinlich et al., "Method for Sparse Representation of Dense Motion Vector Fields for Compression of Visual Pixel Data," Invention Report No. 2011E00668DE, Jan. 14, 2011, 5 pages.

Soo-Chul Han et al., "Video compression with dense motion fields," IEEE Transactions on Image Processing, vol. 10, No. 11, Nov. 2001, pp. 1605-1612.

Chung-Lin Huang et al., "A new motion compensation method for image sequence coding using hierarchical grid interpolation," IEEE Transactions on Circuits and Systems for Video Technology, vol. 4, No. 1, Feb. 1994, pp. 42-52.

Itu, "Advanced video coding for generic audiovisual services; Series H: Audiovisual and Multimedia Systems; Infrastructure of audiovisual services—coding of moving video," Recommendation ITU-T H.264 and ISO/IEC 14496-10 (MPEG-4 AVC) (2010), Mar. 2010, 676 pages.

Claude E. Duchon, "Lanczos Filtering in One and Two Dimensions," Journal of Applied Meteorology, vol. 18, Aug. 1979, pp. 1016-1022.

Kostadin Dabov et al., "Image denoising by sparse 3-D transform-domain collaborative filtering," IEEE Transactions on Image Processing, vol. 16, No. 8, Aug. 2007, pp. 2080-2095.

Andreas Weinlich et al., "Sparse representation of dense motion vector fields for lossless compression of 4-D medical CT data," 19th European Signal Processing Conference (EUSIPCO 2011), Aug. 29-Sep. 2, 2011, pp. 1352-1356.

Wei Chen, "Conservative Motion Estimation from Multi-image Sequences," Advances in Visual Computing, Springer Berlin, Heidelberg, Nov. 29, 2010, pp. 427-436.

Ashraf A. Kassim et al., "Motion Compensated Lossy-to-Lossless Compression of 4-D Medical Images Using Integer Wavelet Transforms," IEEE Transactions on Information Technology in Biomedicine, vol. 9, No. 1, Mar. 2005, pp. 132-138.

Yiannis Andreopoulos et al., "Complete-to-overcomplete discrete wavelet transforms for scalable video coding with MCTF," Visual Communications and Image Processing, Jul. 2003, Proc. of SPIE, vol. 5150, pp. 719-731.

Andreas Weinlich et al., "Representation of deformable motion for compression of dynamic cardiac image data," Proceedings of SPIE, vol. 8314, Jan. 2012, pp. 83140E-83140E-10.

Yosi Keller et al., "Fast Motion Estimation Using Bidirectional Gradient Methods," IEEE Transactions on Image Processing, vol. 13, No. 8, Aug. 2004, pp. 1042-1054.

Yannan Wu et al., "Image registration method based on local high order approach," IEEE International Symposium on Circuits and Systems, 2009, Iscas 2009, May 24, 2009, pp. 746-749.

Soo-Chul Han et al., "Video Compression With Dense Motion Fields," IEEE Transactions on Image Processing, vol. 10, No. 11, Nov. 2001, pp. 1505-1512.

Barbara Zitová et al., "Image Registration Methods: A Survey," Image and Vision Computing, vol. 21, Oct. 2003, pp. 977-1000.

R.N.H. Graham et al., "DICOM demystified: A review of digital file formats and their use in radiological practice," Clinical Radiology, vol. 60, Nov. 2005, pp. 1133-1140.

European Office Action for European Priority Application No. 12153221.2, issued Jun. 19, 2012, 12 pages.

English language International Search Report for PCT/EP2012/063548, mailed Aug. 29, 2012, 5 pages.

\* cited by examiner

METHOD FOR CODING A SEQUENCE OF DIGITAL IMAGES

CROSS REFERENCE TO RELATED APPLICATIONS

This application is based on and hereby claims priority to International Application No. PCT/EP2012/063548 filed on Jul. 11, 2012 and European Application Nos. 11175227.5 filed on Jul. 25, 2011 and 12153221.2 filed on Jan. 31, 2012, the contents of which are hereby incorporated by reference.

BACKGROUND

The invention concerns a method for coding a sequence of digital images as well as a corresponding method for decoding. Furthermore, the invention refers to a coding apparatus and a decoding apparatus as well as a system for coding and decoding a sequence of images.

For a fast and efficient transmission and storage of images, compression algorithms are used in order to exploit the spatial, temporal and probabilistic redundancies in the images. In video coding, block-based motion compensation techniques are known which seek to reduce the spatial variations in using a block-based transitional motion prediction and compensation in time direction. To do so, the motion of predefined blocks comprising several pixels in a current image relative to the previous image in an image sequence is determined, minimizing an intensity difference norm. Using this motion information for prediction, only the residual error, which contains much less variation, has to be transmitted in order to obtain a lossless reconstruction at the decoder. Block-based methods have the disadvantage of generating block artifacts at block boundaries in the decoded image. Several improvements of block-based motion compensation are described in the related art, e.g. an adapting block-size, adaptive choice of intra-coding, weighted prediction from multiple preceding and succeeding image, in-loop filtering, and so on.

Besides block-based motion compensation, there are also approaches for pixel-based motion compensation. By this motion compensation, an arbitrary motion can be described using pixel-based motion vector fields. These methods have the disadvantage that due to the large number of motion vectors, much side information has to be transmitted to the decoder. In order to reduce this side information, the reference "Sparse representation of dense motion vector fields for lossless compression of 4-D medical CT data," by A. Weinlich et al. (EUSIPCO, 2011) describes a sparse representation of dense motion vector fields where only significant motion vectors with respect to their prediction capability are coded.

SUMMARY

It is one possible object to provide a method for coding a sequence of digital images with a high coding efficiency, i.e. providing a good quality of decoded images at a high compression rate.

The inventors propose a method for coding a sequence of digital images, where each image has the same image format and comprises a plurality of pixels with assigned pixel values. Due to the same image format, each pixel in the image format corresponds to a predetermined pixel in each image. According to the method, motion parameters between first and second images are determined, where based on said motion parameters motion compensation is performed for coding a sequence of images, where said motion parameters are included in the coded sequence of images. The term "image" is to be interpreted broadly and may refer to an arbitrary array of pixels, e.g. a two-dimensional or three-dimensional or higher-dimensional array of pixels.

The method is characterized by a new sort of motion parameters. I.e., the motion parameters between a first image and a second image comprise a scalar field instead of motion vectors, where said scalar field has scalar values for a plurality of image positions in the image format. Those image positions need not correspond to pixel positions. In a preferred embodiment described below, the scalar field comprises scalar values which are known at a number of image positions which is lower than the number of pixels in the image format. The scalar field is determined such that gradient vectors derived from the scalar field correspond to motion vectors for the motion compensation, i.e. the gradient vectors are identical to the motion vectors or the motion vectors can be determined by multiplying the gradient vectors with a factor. A gradient vector is represented by the well-known gradient of the scalar field within an image. Due to the definition of the scalar field, the gradient vector corresponds to a motion vector as defined in prior art coding techniques.

The coding method has the advantage that instead of motion vectors, a scalar field is included in the coded sequence of images, thus reducing the side information and resulting in a higher coding efficiency. Furthermore, as the approach is not based on image blocks, blocking artifacts are eliminated. This results in a better compression in case that decorrelation methods are applied to the information in the coded bitstream, e.g. to the prediction error calculated in predictive coding.

The proposals are based on the realization that motion vectors in certain sequences of images can be represented based on a scalar field. This field is preferably determined by searching for the scalar field which minimizes the residual error between the pixel values of the second image and the pixel values of the first motion-compensated image, where the first motion-compensated image is determined based on gradient vectors derived from the scalar field. I.e., the scalar field is determined based on a solution of an optimization problem minimizing a residual error. However, in practical implementations, not necessarily the absolute minimum is found. Depending on the coding effort, also a sub-optimal solution can be used for the scalar field. Nevertheless, this solution is also found by a search for a scalar field which minimizes the residual error.

In a preferred embodiment, the residual error is represented by the sum of absolute pixel value differences between the second and the first image, where each absolute pixel value difference corresponds to the absolute difference between a pixel value at a second pixel position in a second image and a pixel value at a first pixel position in a first image, said first pixel position corresponding to the second pixel position compensated by the gradient vector of a sampled version of a scalar field at said second pixel position. The term "absolute difference" is to be interpreted broadly and may, e.g. also comprise squared differences. In a particular preferred embodiment, the scalar field includes scalar values for image positions less than the number of pixels in the image format, where the sampled version of the scalar field is determined by interpolating an up-sampled version of the scalar field. In this embodiment, the side information to be transmitted for decoding is reduced due to the use of a scalar field including a reduced number of scalar values. In a preferred variant of the above embodiment, the up-sampled version of the scalar field is interpolated by a windowed sinc function, particularly a Lanczos filter. Other interpolation techniques may be used as well, e.g. a spline interpolation.

In order to determine the scalar field, well-known solvers for non-linear least squares problems can be used, e.g. an (iterative) Gauss-Newton algorithm and/or the Levenberg-Marquardt algorithm. In another embodiment, the motion parameters (i.e. the scalar field) are subjected to a transformation and/or data compression, particularly a DCT (DCT=Discrete Cosine Transformation) and/or a Karhunen-Loeve transformation and/or a predictive coding and/or an entropy coding. Due to this embodiment, the coding efficiency is enhanced.

The motion compensation performed in the method can be used for well-known coding techniques. Particularly, the motion-compensation can be performed for a predictive coding where the residual error between the second image and the first image which is compensated by the derived gradient vectors is determined and preferably subjected to a data compression, particularly a spatially predictive coding and/or a whole-image transform like wavelet decomposition and/or an entropy coding. Nevertheless, the motion compensation can also be combined with a motion-compensated temporal filtering.

In a preferred embodiment, the sequence of images coded by the method refers to temporally subsequent images. Nevertheless, the proposal is also applicable for a sequence of spatially subsequent images.

In a particularly preferred embodiment, the sequence of images is based on medical data, i.e. data having been generated by a medical imaging device, particularly by a CT equipment (CT=Computed Tomography) and/or a MRT equipment (MRT=Magnetic Resonance Tomography). In this embodiment, the sequence of images is preferably a temporal or spatial sequence of slices in human or animal tissue, particularly in tissue comprising a human or animal organ, e.g. a heart.

Beside the above method, the inventors also propose an apparatus for coding a sequence of digital images, each image having the same image format and comprising a plurality of pixels with assigned pixel values. The apparatus comprises a device for determining motion parameters between first and second images, said motion parameters being used in motion compensation performed for coding the sequence of images, where said motion parameters are included in the coded sequence of images. In this apparatus, the device for determining motion parameters includes a device for determining a scalar field having scalar values for a plurality of image positions in the image format, wherein the scalar field is determined such that gradient vectors derived from the scalar field correspond to motion vectors for the motion compensation. The apparatus is preferably arranged for performing one or more of the preferred embodiments of the method.

The inventors also propose a method for decoding a sequence of digital images which is coded by the coding method or one or more preferred embodiments of this coding method. In this decoding method, one or more scalar fields for corresponding first and second images in the coded sequence of images are extracted and the gradient vectors are derived from each extracted scalar field, where motion compensation is performed based on the derived gradient vectors, resulting in a decoded sequence of images.

The inventors also propose to an apparatus for decoding a sequence of digital images which is coded by a coding method or one or more preferred embodiments of the coding method. The apparatus comprises a device for extracting one or more scalar fields for corresponding first and second images in the coded sequence of images, a device for deriving gradient vectors from each extracted scalar field and a device for performing a motion compensation based on the derived gradient vectors, resulting in a decoded sequence of images.

The inventors also propose a system for coding and decoding a sequence of images comprising the above described coding apparatus and the above described decoding apparatus.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

In the following, an embodiment will be described with respect to a sequence of medical images taken by a CT equipment, where each image is a so-called slice, representing a volume of a plurality of voxels in a human tissue. The sequence of images is a temporal sequence so that subsequent images refer to the same position in human tissue but taken at different points in time. Hence, the images refer to temporally succeeding two-dimensional arrays of pixels. However, the method is also applicable to three-dimensional arrays of pixels and/or to a sequence of spatially succeeding slices taken from human tissue.

The voxels in each slice represent the tissue densities of human organs moving over time where the tissue densities are represented by respective pixel values of the voxels. In one embodiment, a temporal sequence of cardiac CT data showing the deformable motion for physiologic muscle tissue of a human heart is coded based on the method. In principle, the method is applicable on arbitrary kind of data where the sequence of images includes deformable motion. Contrary to the related art, the proposed methods and devices are not based on a block-based motion compensation using motion vectors showing from which position in the previous image the blocks were shifted. Instead, a set of parameters is defined to represent tissue deformation between two temporally succeeding images. These parameters are then optimized to result in a low-energy prediction error image.

To do so, a scalar field is used in order to derive a dense motion vector field used for motion compensation between succeeding slices. The dense motion vector field $v(x)=(v_x(x), v_y(x))^T$ shows for each voxel position $x=(x,y)$ in the image function $s_2(x)$ of a temporally succeeding (second) image of the sequence where the voxel's gray level was located in the temporally preceding image function $s_1(x)$ of a (first) preceding image. Hence, the vectors of the dense motion vector field are negative vectors showing voxel shifts from $s_1$ to $s_2$. For readability the parameter x of the above functions will be omitted when there is no ambiguity. When v is seen as a flow field, its source or sink characteristic at each position can be computed using the divergence $$\text{div}(v(x)) = \nabla \cdot v(x), x \in \Omega \subset \mathbb{R}^2 \quad (1),$$

where $\nabla = (\partial/\partial x, \partial/\partial y)^T$ is a differential operator, · denotes the inner product and the slice domain $\Omega$ contains all voxel positions of a slice. In the images processed in the method as described herein, v describes the deformation of tissue. As a consequence, the divergence can be interpreted as a measure for local tissue expansion and contraction instead of source and sink characteristic. Another vector field characteristic is called curl, which describes how much an object at a certain position within a flow field would start rotating.

Tissue motion, e.g. in heart acquisitions, is caused by muscle cells which can only expand or contract, but not shift their positions relative to each other. Therefore, the curl of the vector field v is zero at each position in $\Omega$. Such vector fields are called conservative or irrotational. It is known from vector calculus that conservative vector fields can completely be expressed as the gradient of a scalar function called potential p:

$$v(x) = \text{grad}(p(x)) = \nabla p(x), \text{curl}(v(x)) = 0 \quad (2),$$

and thus with (1), $$\text{div}(v(x)) = \nabla \cdot \nabla p(x) \quad (3).$$

Muscle contractions are similar in local neighborhoods of the tissue, i.e. they change only slowly among the slice domain. This is because those contractions are initiated by only coarsely located electrical impulses from neurons. The level of change of div(v(x)) among the slice domain can be expressed by its gradient magnitude $$|\text{grad}(\text{div}(v(x)))| = |\nabla \nabla \cdot \nabla p(x) \quad (4).$$

As a consequence, in the images coded by the method as described herein, a scalar potential field p can be determined and, based on the gradient of this field, the dense motion vector field can be derived.

In the embodiment as described herein, a down-sampled version $\hat{p}$ of this potential field is determined and used for motion compensation. Such a down-sampled version can be used because the muscle deformation is similar in local regions resulting in a potential function which is a very smooth function. After having determined $\hat{p}$, the motion vector field v can be reconstructed from $\hat{p}$ in up-sampling and interpolating to p and afterwards computing the gradient $\Lambda p(x)$ (compare equation (2)). In the embodiment as described herein, a 2-D Lanczos filter $\Lambda$ with three lobes, which is a windowed version of the ideal sinc interpolation kernel, is used. In the pixel domain where the distance of succeeding pixels is one and the distance between sampling points in the up-sampled function is d pixels, the interpolation kernel can be written as follows:

$$\Lambda(x) = \begin{cases} \text{sinc}\left(\frac{x}{d}\right)\text{sinc}\left(\frac{x}{3d}\right)\text{sinc}\left(\frac{y}{d}\right)\text{sinc}\left(\frac{y}{3d}\right) & \max(|x|,|y|) < 3 \\ 0 & \text{otherwise,} \end{cases} \quad (5)$$

where $$\text{sinc}(t) = \begin{cases} \frac{\sin(\pi t)}{\pi t} & t \neq 0 \\ 1 & t = 0 \end{cases}.$$

The Lanczos filter is differentiable to second order and therefore is a trade-off between smoothness and computational complexity.

According to the foregoing, it is the main goal described herein to find the deformation parameters (i.e. the down-sampled potential field) $\hat{p}$ for the best deformation of $s_1$ in order to approximate $s_2$. To achieve this, an iterative optimization algorithm is implemented. This algorithm does not compute $\hat{p}$ directly but rather checks different possible functions $\hat{p}$ for their caused prediction error until this error achieves a minimum. Mathematically, this results in a minimization of the sum of squared differences and thus the mean squared error (MSE) between $s_2$ and the deformation of $s_1$, i.e.:

$$\hat{p} = \underset{\hat{p}}{\text{argmin}}\left(\sum_{x \in \Omega}(s_2(x) - s_1(x + \nabla(\Lambda * \hat{p}_u)(x)))^2\right). \quad (6)$$

Here $\hat{p}_u$ is the up-sampled version of $\hat{p}$ and * denotes a convolution. In the embodiment as described herein, the minimization problem is solved by the well-known iterative Gauss-Newton algorithm for non-linear least squares problems. However, other algorithms may be used, e.g. the well-known Levenberg-Marquardt algorithm. Contrary to motion vector components from block-based motion estimation, the down-sampled potential function is strongly correlated, so for further decorrelation, an additional transform or spatial prediction is applied in a preferred embodiment. Furthermore, since a gradient computation creates non-integer vectors, in contrast to block-based motion compensation, motion compensation with bilinear interpolation in $s_1$ allows $\hat{p}$ representing sub-voxel accurate motion without additional storage demands.

In the Gauss-Newton algorithm used in the embodiment described herein, a Jacobian matrix is calculated which contains the partial derivatives of the pixel values with respect to each of the parameters ending up in a matrix of dimension (number of pixels)×(number of parameters). The parameters are represented by the number of sampling points in the image according to the down-sampled scalar field $\hat{p}$. The derivatives are computed using forward differences, i.e. in each estimation the impact for each parameter on the residual error is computed when this parameter is increased by a small amount. The change in this residual error is put into the matrix as one column. From this matrix and from the current residual error image, the estimation method computes how the set of parameters is to be changed here in order to converge to the best set of parameters and thus the least residual error image, giving the fixed number of parameters.

Afterwards, the parameters are changed accordingly and the residual is computed anew for the next iteration. For a particularly efficient implementation, the change in the residual error can be computed such that, weighted with the optimization step size, the gradient of the up-sampling filter is added to the reconstructed vector field at the parameter position. At positions, where this addition changes the vector field (i.e. where this gradient is not equal to zero), the motion compensation is done again and the difference of this new estimation to the estimation without parameter variation is put into the sparse Jacobian matrix.

According to a preferred embodiment, the scalar potential field $\hat{p}$ is calculated based on the following pseudo code:

```
parameters: value_number_in_ p̂; step_size, max_iteration_number
input      : s₁,s₂
output     : p̂
1    for i ← 1 to value_number_in_p̂ do p̂ᵢ ← 0;
2    iteration_number ← 1;
3    current_MSE ← ∞; previous_MSE ← ∞;
4    while iteration_number < max_iteration_number and current_MSE ≤ previous_MSE do
5    |    p ← Lanczos_Upsampling (p̂);
6    |    v ← Gradient (p);
7    |    s₂^estimation ← Interpolation_Dense_Motion_Compensation(s₁, v);
8    |    difference ← s₂ - s₂^estimation;              //prediction error image
9    |    for i ← 1 to value_number_in_p̂ do            //compute Jacobian matrix
10   |    |    p̂^modified ← p̂;
11   |    |    p̂ᵢ^modified ← p̂ᵢ^modified + step_size;
12   |    |    p ← Lanczos_Upsampling (p̂^modified) ;
13   |    |    v ← Gradient (p);
14   |    |    s₂^modified estimation ← Interpolated_Dense_Motion_Compensation (s₁, v);
15   |    |    jacobianᵢ ← Write_as_Vector(s₂^modified estimation - s₂^estimation); //put into ith column
16   |    end
17   |    p̂ ← p̂ + step_size · Write_as_Matrix((jacobian^T · jacobian)⁻¹ · (jacobian^T · difference)).
18   |    previous_MSE ← current_MSE;
19   |    current_MSE ← MSE(difference);
20   |    i ← i + 1;
21   end
```

According to the above pseudo code, there are only a few parameters to be defined, so the optimization is very robust. The optimization in the pseudo code is included in the loop starting in line 4. An important choice is the number of values in $\hat{p}$, i.e. the number of sampling points of the down-sampled scalar field $\hat{p}$ in the respective image. This number scales the amount of motion information. Increasing the size of $\hat{p}$ reduces the prediction error information. However, the decision for this trade-off depends on the subsequent coding methods for both $\hat{p}$ and the prediction error. The optimization step size was chosen to be 0.2, whereas the number of iterations was limited to a maximum of 100 in tests performed by the inventors. This is a good choice for accurate approximations. For lower computational complexity, the step size can also be increased while the maximum number of iterations can be decreased.

For the Gauss-Newton optimization in the above pseudo code, the Jacobian matrix has to be computed as described before. The Jacobian matrix is obtained using forward differences. This means, in each iteration the impact of a small increase of a value $\hat{p}_i$ in $\hat{p}$ (see line 11 of the pseudo code) on the difference in equation (6) is computed for each value $\hat{p}_i$ (i.e. the value of the scalar function at a sampling position i). However, for performance reasons, this difference in line 15 is only evaluated in a range around the current sampling position where the Lanczos filter operates. At positions further away, the difference is zero anyway since the change of a value in $\hat{p}$ has only local impact. Thus, motion compensation can also be restricted to this local neighborhood. Another performance gain is achieved by computing the local change in v already in advance during initialization. To do so, line 10 to 13 in the above pseudo algorithm are replaced by a simple addition of this change function to the corresponding region in v. This is possible because Lanczos filtering and gradient computation are linear operations and, thus, the change is constant for a fixed step size. Furthermore, the Jacobian is a sparse matrix, so it should be treated as such in an implementation, i.e. zeros should not be stored in memory and multiplications with zeros should not be computed. Eventually, for numerical stability, of course the inversion in line 17 should not be performed explicitly but rather the system of linear equations should be solved. Besides, for some data sets, e.g. with single-intensity backgrounds, the inversion is ill-conditioned and so requires a regularization.

Figure 1:
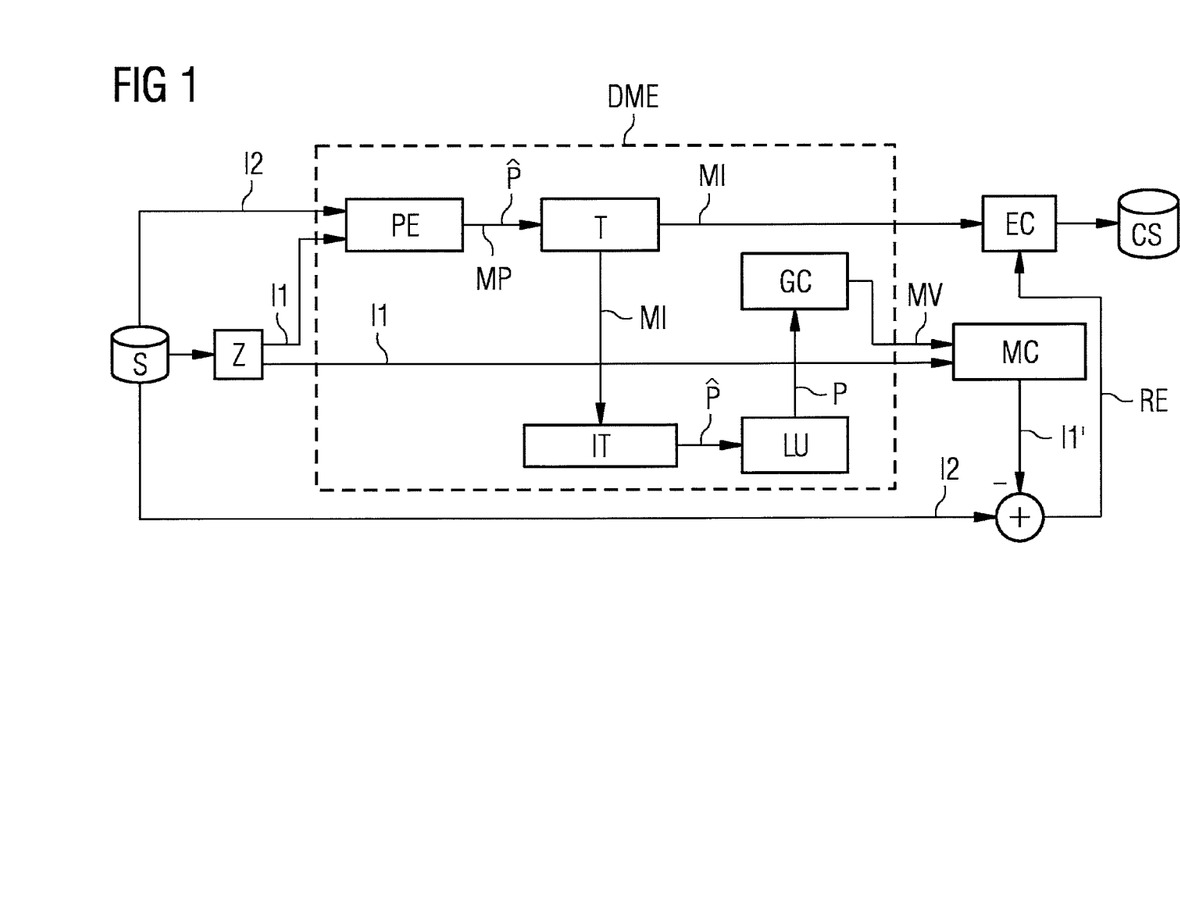
FIG. 1 shows a block diagram illustrating a coding method according to a potential embodiment of the proposal.

FIG. 1 shows a block diagram illustrating the overall coding of a sequence of images based on the above described estimation of the scalar field $\hat{p}$. The part in this diagram referring to the deformable motion estimation for calculating motion vectors based on a scalar potential field is included in block DME. The input of the coding method is a sequence of images designated as S in FIG. 1. In order to code a second image I2 in the sequence, the preceding first image I1 is used which is taken from a buffer z. Based on those first and second images, the above described parameter estimation PE is performed, resulting in motion parameters MP representing the down-sampled values of the scalar potential function $\hat{p}$. In the embodiment of FIG. 1, those parameters are transformed, e.g. via a DCT. For storage, the floating point values from the optimization performed in PE may optionally be quantized to integer numbers. Because of the rather large distance between sampling points, e.g. 16 voxels, the impact of this quantization on motion vector accuracy is only within sub-voxel range and affects the prediction error only marginally. The motion information MI resulting from the transformation T is thereafter losslessly coded by an entropy coder EC and forms a part of the coded sequence of images CS.

According to the embodiment of FIG. 1, a predictive coding of a residual error between the pictures I2 and I1 is performed. To do so, the motion information MI is subjected to an inverse transformation IT resulting in a reconstructed scalar field $\hat{p}$. This scalar field is subjected to an up-sampling and a Lanczos filtering LU, i.e. the expression $(\Lambda^*\hat{p}_u)(x)$ from equation (6) is evaluated. This results in an interpolated and up-sampled scalar field p. Based on this scalar field, the gradient vectors are computed in GC. This computation provides corresponding motion vectors MV for each pixel. Based on these motion vectors, a motion compensation MC with respect to the first image I1 is performed, resulting in a motion-compensated first image I1'. Thereafter, the difference between I2 and I1' is calculated, resulting in a residual error RE which is entropy encoded in the entropy encoder EC. This residual error RE is also part of the bitstream representing the sequence of coded images CS. In another embodiment, the residual error may additionally be coded before entropy coding, e.g. based on a wavelet coding or a predictive coding based on JPEG-LS.

Figure 2:
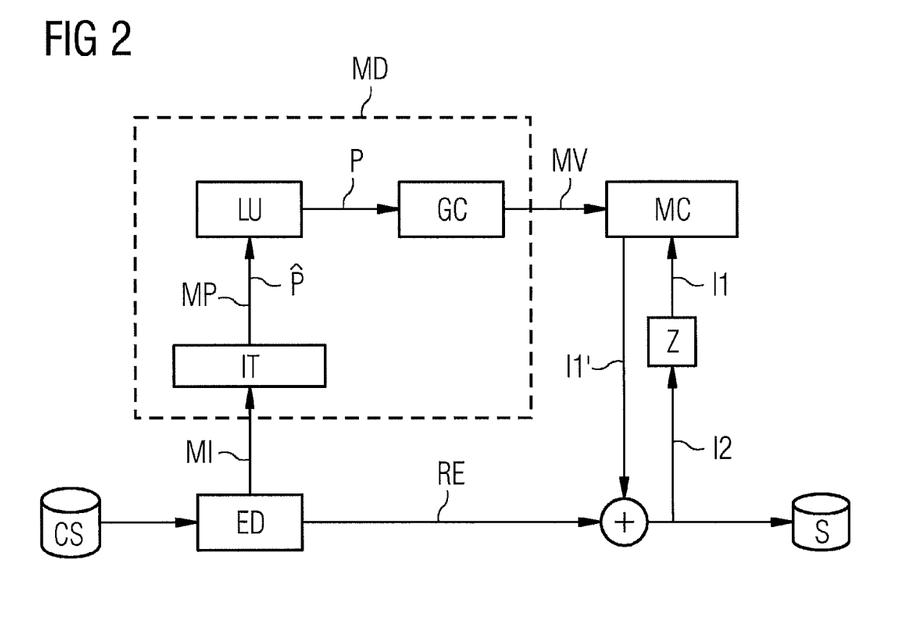
FIG. 2 shows a block diagram illustrating a decoding method according to a potential embodiment of the proposal.

FIG. 2 shows a block diagram describing the process of decoding the coded bitstream CS generated by the coding method of FIG. 1. The process elements for decoding the motion vectors are included in the block MD. At first, an entropy decoding is applied to the coded bitstream, resulting in the motion information MI including the transformed potential function $\hat{p}$. This motion information is subjected to the inverse transformation IT, resulting in the motion parameters MP including the down-sampled scalar potential function $\hat{p}$. These motion parameters are subjected to Lanczos up-sampling LU analogously to FIG. 1, resulting in an up-sampled scalar potential field p which is thereafter subjected to gradient calculation GC, also analogously to FIG. 1. As a result, the motion vectors MV are reconstructed. Those motion vectors are used in a motion compensation MC for calculating a motion-compensated predicted image I1' based on the previous image I1 taken from the storage z. This predicted image I1' is combined with the residual error RE obtained by entropy decoding ED. As a result, a decoded image I2 and thus a decoded bitstream S is generated.

Figure 3:
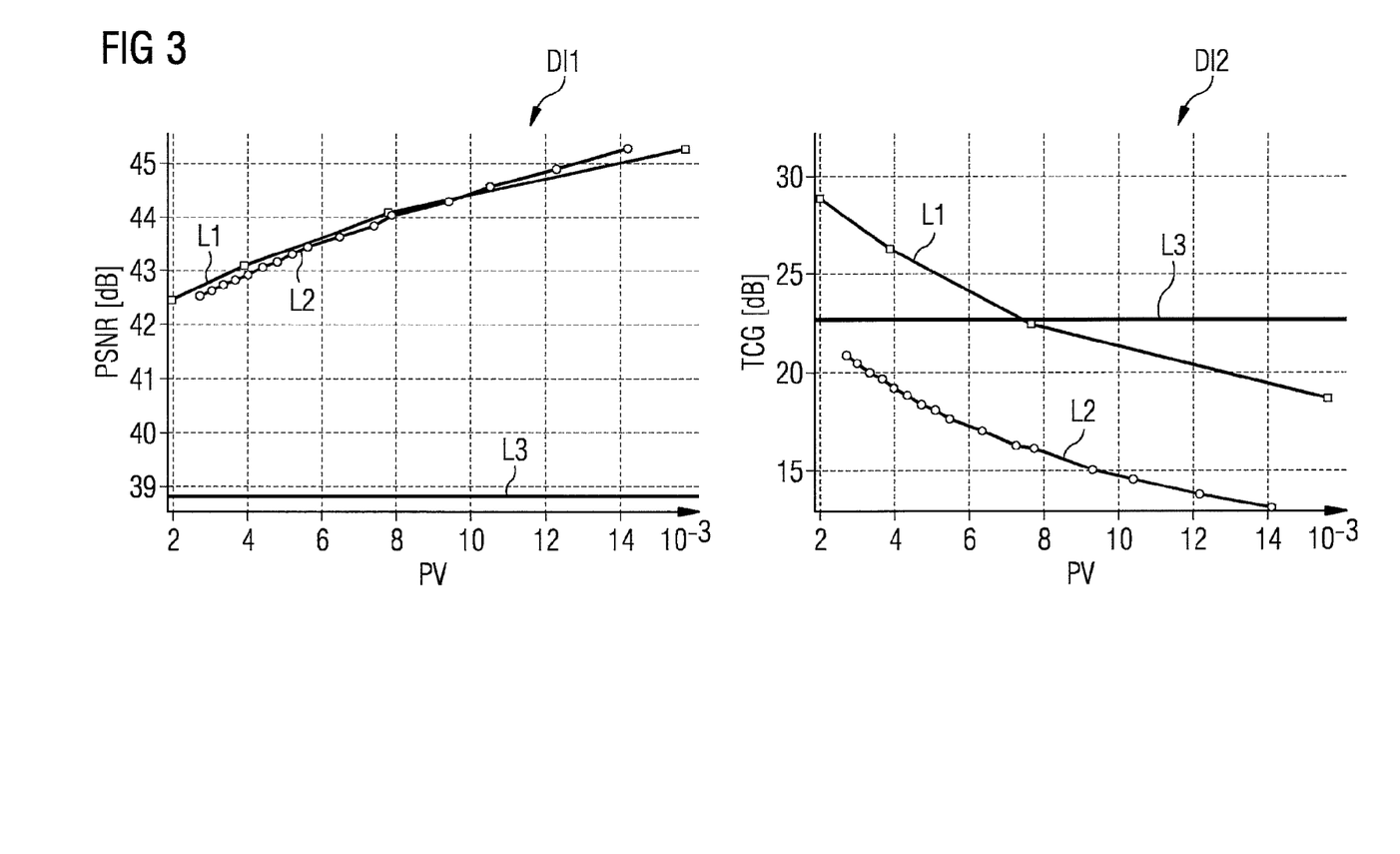
FIG. 3 shows diagrams illustrating the quality of coding according to a potential embodiment of the proposal in comparison with related art methods.

FIG. 3 shows the results of an embodiment used for coding CT images of a human heart. FIG. 3 includes two diagrams D1 and D2 where the abscissa PV (PV=parameter values) in both diagrams represent the number of values of the scalar potential function $\hat{p}$ per pixel/voxel. Line L1 in both diagrams refers to an embodiment, line L2 to a block-based motion compensation according to the related art and line L3 to a coding with zero motion vectors. In diagram D1, the prediction quality based on the peak signal-to-noise ratio PSNR depending on parameter values PV is shown. The higher the value of PSNR, the better is the prediction quality. Evidently, the prediction quality of the method is similar to the prediction quality of a block-based motion compensation. In diagram D2, the transform coding gain after subjecting the prediction error RE to a whole-slice DCT is shown. Due to the absence of block artifacts in the coding method, a remarkably higher gain is achieved in comparison to the block-based motion compensation.

The proposals as described in the foregoing may be improved by several options. In estimating the parameters (i.e. down-sampled values) of the potential field, the parameter number and the sampling positions in the field can also be subjected to optimization in order to reduce the parameter correlation and further improve the approximation with minimum motion information. This results into an irregular sampling grid. When using such a grid, the sampling positions have to be transmitted in the coded bitstream which can be done analogously to the method of document [1]. There, simple run-level encoding or alternatively more complex algorithms like optimal route calculation are applied.

In order to improve the estimation of the potential function $\hat{p}$, instead of a Lanczos filter, higher-order interpolation schemes can be used, particularly if motion of the pixel data has a smooth structure.

In a further improvement, if the data contains correlated noise like in CT reconstructions, a denoising may be performed prior to the motion estimation, where the noise is coded separately with an algorithm able to exploit this correlation, so that the deformation does not remove such correlations. Even if the noise is uncorrelated, at least an in-loop denoising may be useful. In an alternative, the denoised image data may be used for motion estimation while coding the original image data using the motion information generated from the denoised data. Furthermore, the algorithm itself may be used for a denoising. Therefore, deformations from neighboring frames may be averaged to obtain a denoised current frame.

Instead of using the predictive coding for determining a residual error as described in the embodiment of FIG. 1, different schemes for coding may be applied, particularly motion-compensated temporal filtering. To do so, an inverse deformation can be derived from an already transmitted motion without additional information that estimates the previous frame using a deformation of the current frame. This involves a reconstruction of the dense motion vector field as well as a positioning of the negative vectors at the positions where they point to and finally a Delaunay triangulation in order to interpolate the inverted vector field at regular grid positions.

The proposals as described in the foregoing has several advantages. Particularly, the deformable motion of certain data sets can be represented with less motion information at the same residual error which results in a better compression performance of an appropriate coder. In case that the coding information (e.g. the residual error in a predictive coding) is subjected to a whole-image transform, like the wavelet transform, for a better energy compaction it is advantageous that blocking artifacts are completely eliminated in the method at approximately the same residual error.

A representation of the motion by a potential field also has some other inherent advantages. These encompass the robustness of the parameter representation with respect to small variations like quantization. Due to the floating point vectors resulting from the gradient computation, arbitrary sub-pixel accuracy for the motion vectors can be achieved. Another advantage is the almost arbitrary scalability of motion information through the selection of parameter sampling points which is not possible in block-based schemes. Furthermore, the method can be used not only in the time direction but also in an arbitrary spatial direction of multidimensional data sets as well as for deforming volume data.

The method and its optional improvements can be implemented by an encoder and/or decoder. The method may be by modules within the encoder and/or decoder, whereby the modules can be realized in software, hardware or in a combination of software and hardware. For example, the specific method may be stored as program code in a memory attached to a processor unit. The processor unit reads program code out of the memory and executes the method by the program code. In addition, an input and/or output module may be attached to the processor and/or memory to support exchange of data from and/or to the encoder/decoder.

Figure 4:
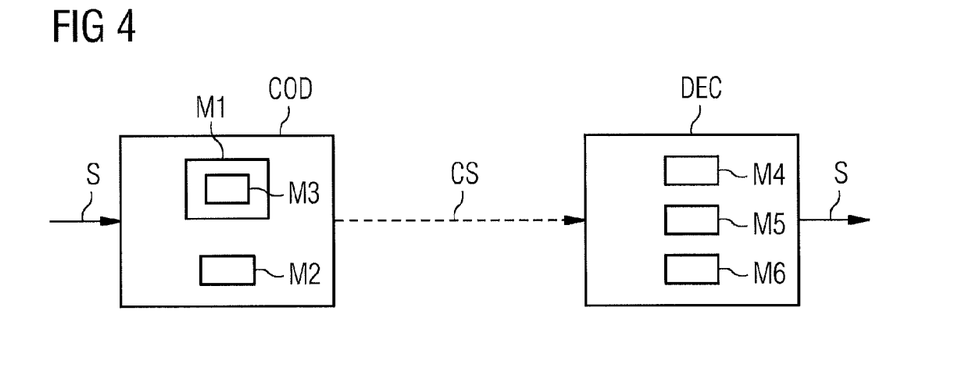
FIG. 4 is a block diagram illustrating a proposed system for coding and decoding.

FIG. 4 shows an example of a system for encoding and decoding a sequence of images based on an encoder COD and a decoder DEC. The encoder COD receives a sequence of digital images S to be coded. The encoder comprises a device for determining motion parameters between first and second images in a sequence, the motion parameters being used in a device M2 for motion compensation performed for coding the sequence of images. The motion parameters are included in the coded sequence of images CS which is transmitted to the decoder DEC. The device M1 comprises a device M3 for determining a scalar field having scalar values for a plurality of image positions, wherein the scalar field is determined by searching for the scalar field which minimizes the residual error between the pixel values of a second image and the pixel values of a first motion-compensated image, where the first motion-compensated image is determined based on gradient vectors derived from the scalar field as described in the foregoing.

The decoder DEC includes a device M4 for extracting the scalar field in the coded sequence of images CS, a device M5 for deriving the gradient vectors from the extracted scalar field and a device M6 for performing a motion compensation based on the derived gradient vectors.

The invention has been described in detail with particular reference to preferred embodiments thereof and examples, but it will be understood that variations and modifications can be affected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for coding a sequence of digital images, each image having a same image format and comprising a number of pixels with assigned pixel values, the method comprising:
   determining motion parameters between a first image and a second image in the sequence of digital images; and
   performing motion compensation for coding the sequence of images based on the motion parameters to produce a coded sequence of images, the motion parameters being included in the coded sequence of images, wherein
   the motion parameters between the first image and the second image comprise a scalar field having scalar values for a plurality of image positions in the image format,
   a single scalar value is associated with a corresponding image position of the plurality of image positions, and
   the scalar field is determined such that gradient vectors derived from the scalar field correspond to motion vectors for the motion compensation.

2. The method according to claim 1, wherein the scalar field is determined by searching for a scalar field that minimizes a residual error between the pixel values of the second image and the pixel values of a first motion-compensated image, the first motion-compensated image being determined based on the gradient vectors derived from the scalar field.

3. The method according to claim 2, wherein the residual error is represented by a sum of absolute pixel value differences between the second image and the first image, each absolute pixel value difference corresponding to an absolute difference between a pixel value at a second pixel position in the second image and a pixel value at a first pixel position in the first image, the first pixel position corresponding to the second pixel position compensated by the gradient vector of a sampled version of the scalar field at the second pixel position.

4. The method according to claim 1, wherein
   a sampled version is used for the scalar field,
   the sampled version of the scalar field includes scalar values for image positions less than a number of pixels in the image format, and
   the sampled version of the scalar field is determined by interpolating an up-sampled version of the scalar field.

5. The method according to claim 4, wherein the up-sampled version is interpolated by a windowed sinc function.

6. The method according to claim 5, wherein the windowed sinc function is a Lanczos filter.

7. The method according to claim 1, wherein the scalar field is determined by a solver for non-linear least squares problems.

8. The method according to claim 7, wherein the solver for non-linear least squares problems is a Gauss-Newton algorithm and/or Levenberg-Marquardt algorithm.

9. The method according to claim 1, wherein the motion parameters are subjected to a transformation and/or data compression.

10. The method according to claim 9, wherein the transformation and/or data compression are a Discrete Cosine transformation and/or a Karhunen-Loeve transformation and/or a predictive coding and/or an entropy coding.

11. The method according to claim 1, wherein the motion-compensation is performed for a predictive coding in which a residual error between the second image and the first image that is compensated by the gradient vectors derived from the scalar field is determined and subjected to a data compression.

12. The method according to claim 11, wherein the data compression is a spatially predictive coding and/or a whole-image transform and/or an entropy coding.

13. The method according to claim 1, wherein the motion-compensation is performed for a motion-compensated temporal filtering.

14. The method according to claim 1, wherein the sequence of digital images includes temporally subsequent images or spatially subsequent images.

15. The method according to claim 1, wherein the sequence of digital images is generated by a medical imaging device.

16. The method according to claim 15, wherein the sequence of digital images is a temporal or spatial sequence of slices in human or animal tissue, including tissue comprising a human or animal organ.

17. The method according to claim 15, wherein the medical imaging device is a CT equipment and/or an MRT equipment.

18. A method for decoding a sequence of digital images that is coded by a method according to claim 1, wherein
   one or more scalar fields for corresponding the first image and the second image in the coded sequence of images are extracted and the gradient vectors are derived from each extracted scalar field, a motion compensation being performed based on the derived gradient vectors, resulting in a decoded sequence of images.

19. An apparatus for decoding a sequence of digital images that is coded by a method according claim 1, the apparatus comprising:
   one or more processors configured to extract one or more scalar fields for corresponding first and second images in the coded sequence of images, derive the gradient vectors from each extracted scalar field, and perform a motion compensation based on the derived gradient vectors, resulting in a decoded sequence of images.

20. An apparatus for coding a sequence of digital images, each image having a same image format and comprising a number of pixels with assigned pixel values, the apparatus comprising:
   one or more processors configured to:
   determine motion parameters between a first image and a second image in the sequence of digital images;
   perform motion compensation for coding the sequence of images based on the motion parameters to produce a coded sequence of images, the motion parameters being included in the coded sequence of images, wherein
   the motion parameters comprise a scalar field having scalar values for a plurality of image positions in the image format,
   a single scalar value is associated with a corresponding image position of the plurality of image positions, and
   the scalar field is determined such that gradient vectors derived from the scalar field correspond to motion vectors for the motion compensation.

* * * * *